(12) United States Patent
Cheraghi et al.

(10) Patent No.: US 11,540,099 B2
(45) Date of Patent: Dec. 27, 2022

(54) TECHNIQUES FOR REDUCING INTER-VEHICLE INTERFERENCE

(71) Applicant: QUALCOMM Incorporated, San Diego, CA (US)

(72) Inventors: Parisa Cheraghi, Cambridge (GB); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/369,927

(22) Filed: Jul. 7, 2021

(65) Prior Publication Data

US 2022/0014886 A1 Jan. 13, 2022

Related U.S. Application Data

(60) Provisional application No. 63/049,495, filed on Jul. 8, 2020.

(51) Int. Cl.
*H04W 4/46* (2018.01)
*H04W 72/08* (2009.01)

(52) U.S. Cl.
CPC .......... *H04W 4/46* (2018.02); *H04W 72/082* (2013.01)

(58) Field of Classification Search
CPC ........... H04W 4/46; H04W 4/44; H04W 4/40; H04W 84/18; H04W 84/005; H04W 76/14; H04W 4/80; H04W 72/02; H04W 72/048; H04W 4/12; H04W 4/70; H04W 72/121; H04W 4/021; H04W 4/48; H04W 12/06; H04W 12/088; H04W 72/0446; H04W 12/68; H04W 36/34; H04W 4/21; H04W 4/60; H04W 48/04; H04W 36/0005; H04W 4/08; H04W 4/30; H04W 72/10; H04W 76/11; H04W 76/19; H04W 72/04; H04W 72/042; H04W 88/08; H04W 72/085; H04W 4/02; H04L 67/12; H04L 67/10; H04L 67/34; H04L 67/306; H04L 51/02; H04L 63/0428; H04L 63/102; H04L 67/55; H04L 67/30; H04L 5/0053;

(Continued)

(56) References Cited

U.S. PATENT DOCUMENTS

2020/0064865 A1* 2/2020 Lei ................. H04W 48/08
2020/0275412 A1* 8/2020 Kim ................ H04L 1/1819

* cited by examiner

*Primary Examiner* — Golam Sorowar
(74) *Attorney, Agent, or Firm* — Patterson & Sheridan, L.L.P

(57) ABSTRACT

Certain aspects of the present disclosure provide techniques for reducing inter-vehicle interference. In certain aspects, a method performed by a first vehicle may include detecting a second vehicle is in proximity of the first vehicle, determining that the second vehicle includes an intra-vehicle, obtaining resource allocation information associated with the intra-vehicle network of the second vehicle, the resource allocation information indicating a first set of resources allocated to one or more first sensors of the second vehicle located at least in a first portion of the second vehicle, determining that the first set of resources conflict with a second set of resources allocated to one or more first sensors of the first vehicle located in at least a first portion of the first vehicle, and performing one or more actions to resolve the determined conflict between the first set of resources and the second set of resources.

30 Claims, 9 Drawing Sheets

(58) Field of Classification Search
CPC . H04L 41/0894; H04L 5/0048; H04L 5/0073; H04L 41/0823; H04L 41/0896; H04L 41/142; H04L 41/16; H04L 47/50; H04L 5/0007; H04L 5/003; H04L 5/16; H04L 67/04; H04L 67/1078; H04L 67/125; H04L 9/3271; H04L 5/0037; H04L 5/0069; H04L 63/0823; H04L 63/142

See application file for complete search history.

TECHNIQUES FOR REDUCING INTER-VEHICLE INTERFERENCE

CROSS REFERENCE TO RELATED APPLICATION

This application hereby claims priority under 35 U.S.C. § 119 to U.S. Provisional Patent Application No. 63/049,495, filed on Jul. 8, 2020, the contents of which are incorporated herein in their entirety.

BACKGROUND

Field of the Disclosure

Aspects of the present disclosure relate to wireless communications, and more particularly, to techniques for reducing inter-vehicle interference.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved resource allocation in sidelink communication.

Certain aspects of the subject matter described in this disclosure can be implemented in an apparatus for wireless communications by a first vehicle. The apparatus generally includes a processing system configured to: detect a second vehicle is in proximity of the first vehicle; determine that the second vehicle includes an intra-vehicle network based on one or more signals obtained from the second vehicle; obtain resource allocation information associated with the intra-vehicle network of the second vehicle, the resource allocation information indicating a first set of resources allocated to one or more first sensors of the second vehicle located at least in a first portion of the second vehicle; determine that the first set of resources conflict with a second set of resources allocated to one or more first sensors of the first vehicle located in at least a first portion of the first vehicle that corresponds to the first portion of the second vehicle; and perform one or more actions to resolve the determined conflict between the first set of resources and the second set of resources.

Certain aspects of the subject matter described in this disclosure can be implemented in an apparatus for wireless communications by a first vehicle. The apparatus generally includes means for detecting a second vehicle is in proximity of the first vehicle; means for determining that the second vehicle includes an intra-vehicle network based on one or more signals obtained from the second vehicle; means for obtaining resource allocation information associated with the intra-vehicle network of the second vehicle, the resource allocation information indicating a first set of resources allocated to one or more first sensors of the second vehicle located at least in a first portion of the second vehicle; means for determining that the first set of resources conflict with a second set of resources allocated to one or more first sensors of the first vehicle located in at least a first portion of the first vehicle that corresponds to the first portion of the second vehicle; and means for performing one or more actions to resolve the determined conflict between the first set of resources and the second set of resources.

Certain aspects of the subject matter described in this disclosure can be implemented in a method for wireless communications by a first vehicle. The method generally includes detecting a second vehicle is in proximity of the first vehicle; determining that the second vehicle includes an intra-vehicle network based on one or more signals obtained from the second vehicle; obtaining resource allocation information associated with the intra-vehicle network of the second vehicle, the resource allocation information indicating a first set of resources allocated to one or more first sensors of the second vehicle located at least in a first portion of the second vehicle; determining that the first set of resources conflict with a second set of resources allocated to one or more first sensors of the first vehicle located in at least a first portion of the first vehicle that corresponds to the first portion of the second vehicle; and performing one or more actions to resolve the determined conflict between the first set of resources and the second set of resources.

Certain aspects of the subject matter described in this disclosure can be implemented in a first vehicle. The first vehicle generally includes at least one antenna and a processing system configured to: detect, via the at least one antenna, a second vehicle is in proximity of the first vehicle; determine that the second vehicle includes an intra-vehicle network based on one or more signals obtained from the second vehicle; obtain resource allocation information associated with the intra-vehicle network of the second vehicle, the resource allocation information indicating a first set of resources allocated to one or more first sensors of the second vehicle located at least in a first portion of the second vehicle; determine that the first set of resources conflict with a second set of resources allocated to one or more first sensors of the first vehicle located in at least a first portion of the first vehicle that corresponds to the first portion of the second vehicle; and perform one or more actions to resolve the determined conflict between the first set of resources and the second set of resources.

Certain aspects of the subject matter described in this disclosure can be implemented in a computer-readable medium for wireless communications by a first vehicle. The computer-readable medium generally includes codes executable to detect a second vehicle is in proximity of the first vehicle; determine that the second vehicle includes an intra-vehicle network based on one or more signals obtained from the second vehicle; obtain resource allocation information associated with the intra-vehicle network of the second vehicle, the resource allocation information indicating a first set of resources allocated to one or more first sensors of the second vehicle located at least in a first portion of the second vehicle; determine that the first set of resources conflict with a second set of resources allocated to one or more first sensors of the first vehicle located in at least a first portion of the first vehicle that corresponds to the first portion of the second vehicle; and perform one or more actions to resolve the determined conflict between the first set of resources and the second set of resources.

Aspects of the present disclosure provide vehicles, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
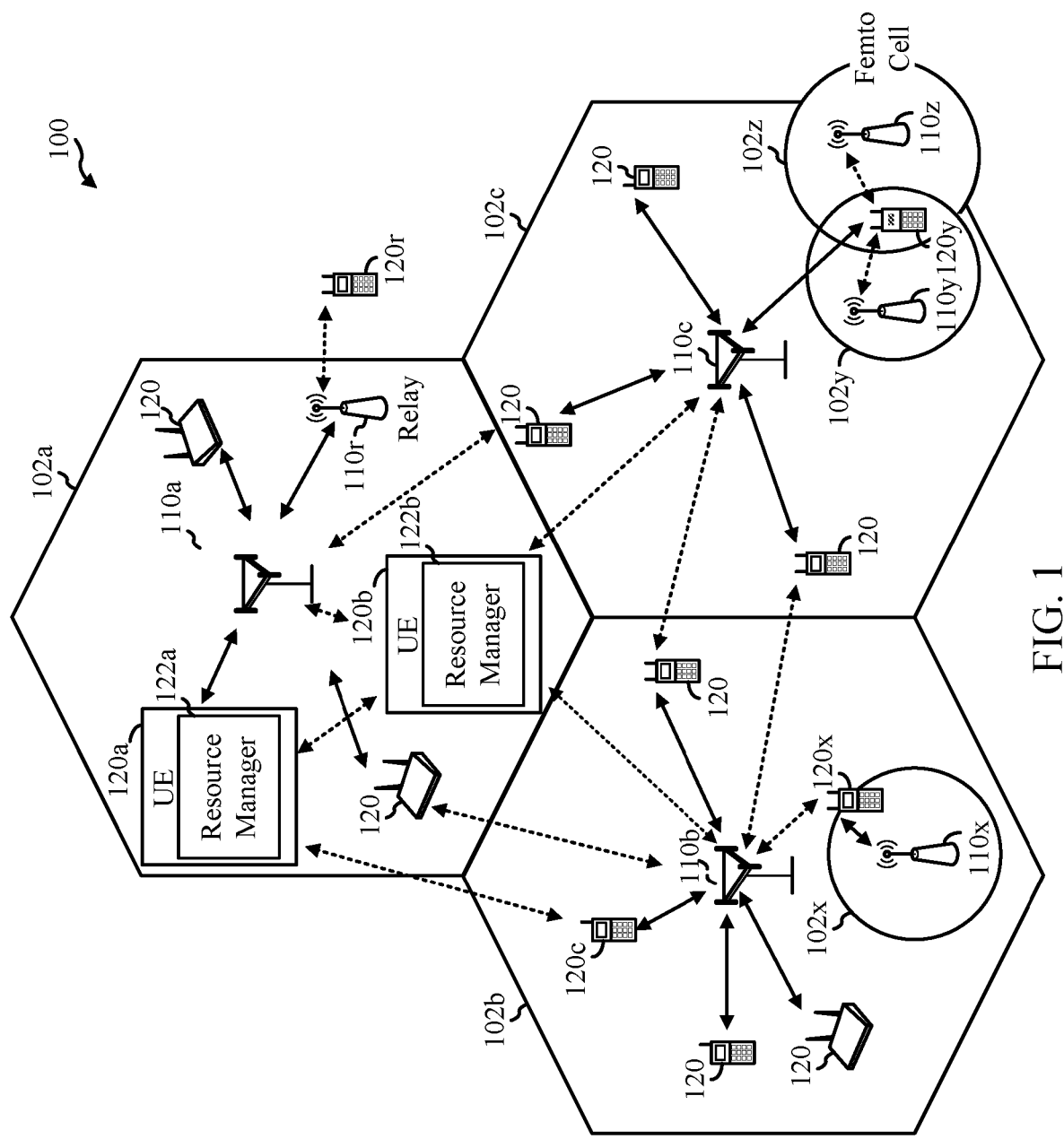
FIG. 1 is a block diagram conceptually illustrating an example wireless communication network, in accordance with certain aspects of the present disclosure.
Figure 1:
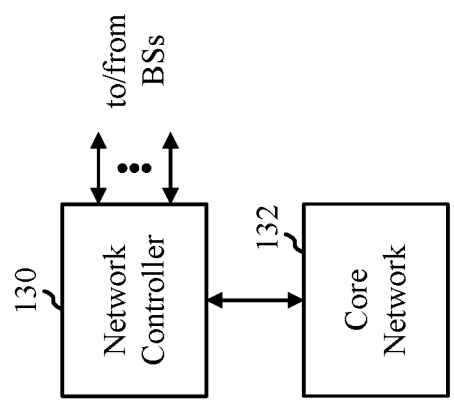

Aspects of the present disclosure provide apparatus, methods, processing systems, and computer readable mediums for reducing inter-vehicle interference. For example, in certain cases, when two vehicles that include intra-vehicle wireless networks are in close proximity to each other, there is a possibility that one or more sensors from one vehicle may interference with one or more sensors of the other vehicle. Such interference may be caused by the overlapping of resource sets allocated to the one or more sensors of each of the vehicles. For example, if the one or more sensors of each of the vehicles are allocated a same set of resources, the transmission of data on these resources from the one or more sensors of one of the vehicles may interference with the transmission/reception of data on the one or more sensors of the other vehicle. Accordingly, aspects of the present disclosure provide techniques for reducing such inter-vehicle interference. In some cases, such techniques involve selecting different sets of resources for vehicles in close proximity to each other. Additionally, in some cases, such techniques may also include reducing a transmission power associated with these sets of resources.

The following description provides examples of reducing inter-vehicle interference, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more BSs 110 and/or UEs 120 in the wireless communication network 100 via one or more interfaces. In some cases, the UEs 120 may comprise one or more vehicles that include intra-vehicle wireless networks.

According to certain aspects, UEs 120 and/or the BSs 110 may be configured for reducing inter-vehicle interference. As shown in FIG. 1, the BS 110a includes a resource manager 112 that allocates resources based at least in part on received CSI, in accordance with aspects of the present disclosure. The UEs 120a and 120b include a resource manager 122a and 122b, respectively, that may be configured to perform the operations illustrated in FIG. 5, as well as other operations described herein for reducing inter-vehicle interference.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
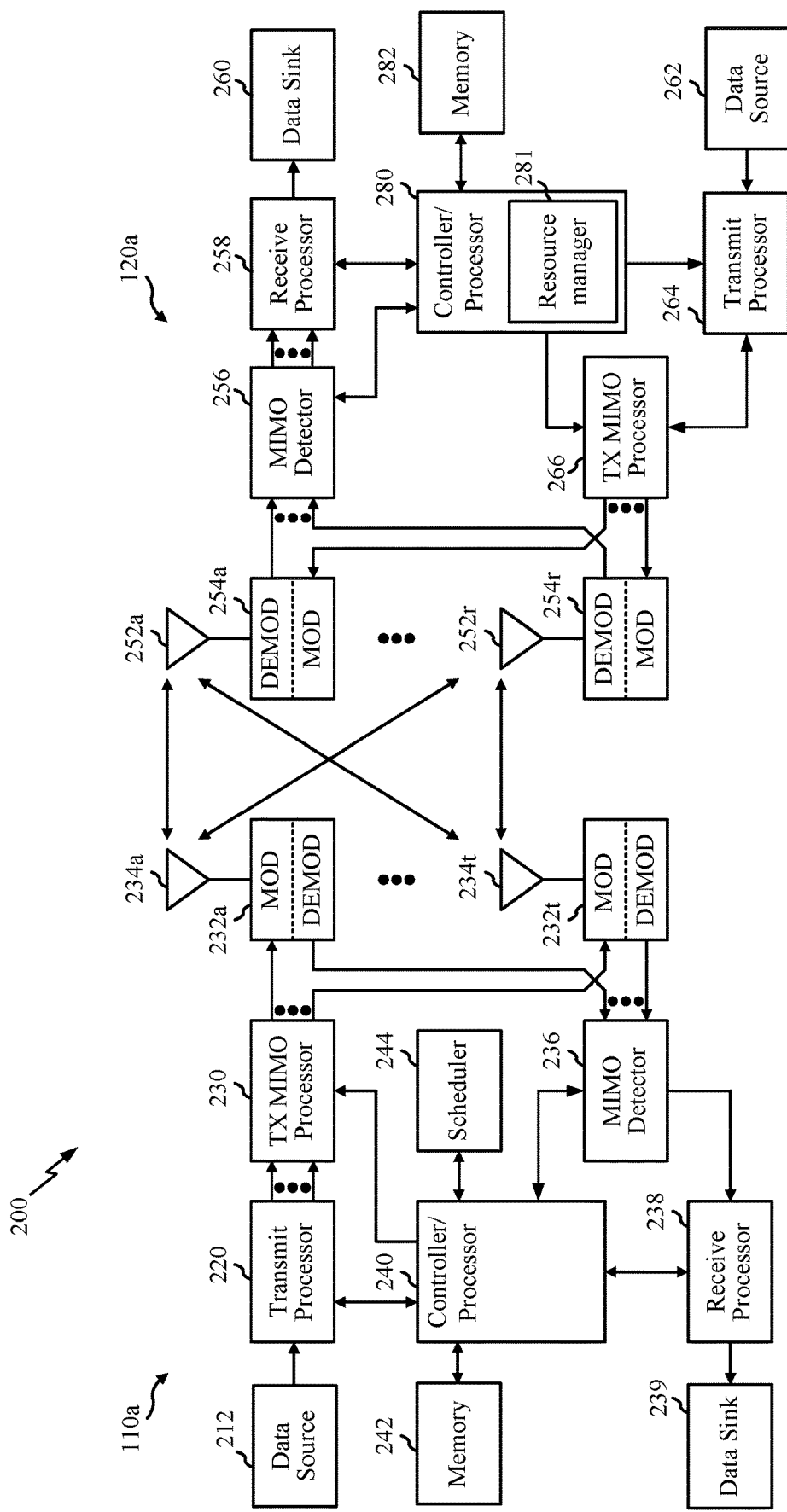
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., which could also be a UE 120b or UE 120c), which may be used to implement aspects of the present disclosure. Further, in some cases, as noted above, UE 120a may comprise a vehicle that includes an intra-vehicle wireless network.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc., and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a includes a resource manager 281 that may be configured to perform the operations illustrated in FIG. 5, as well as other operations described herein for reducing inter-vehicle interference. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
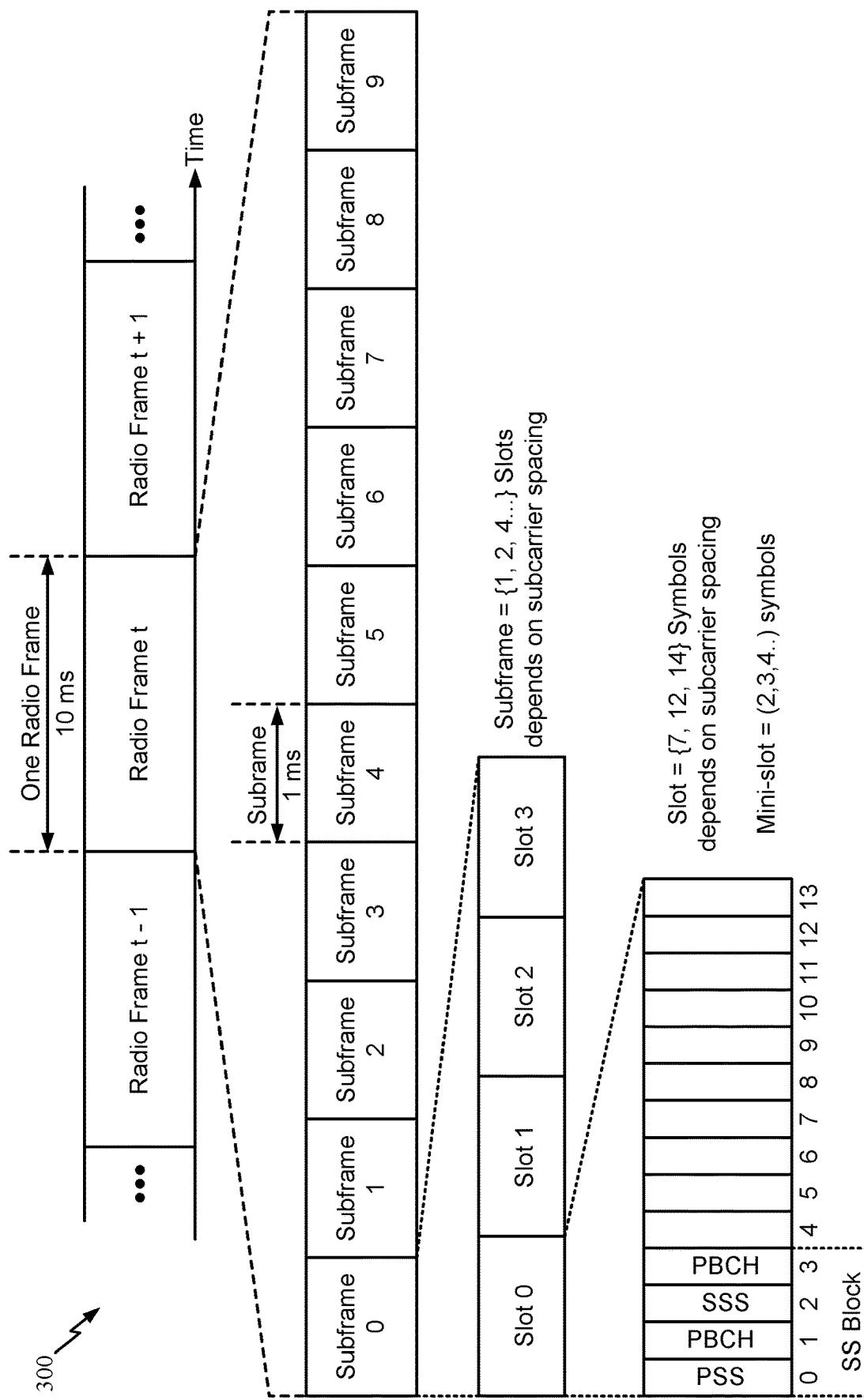
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UEto-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figures 4A, 4B:
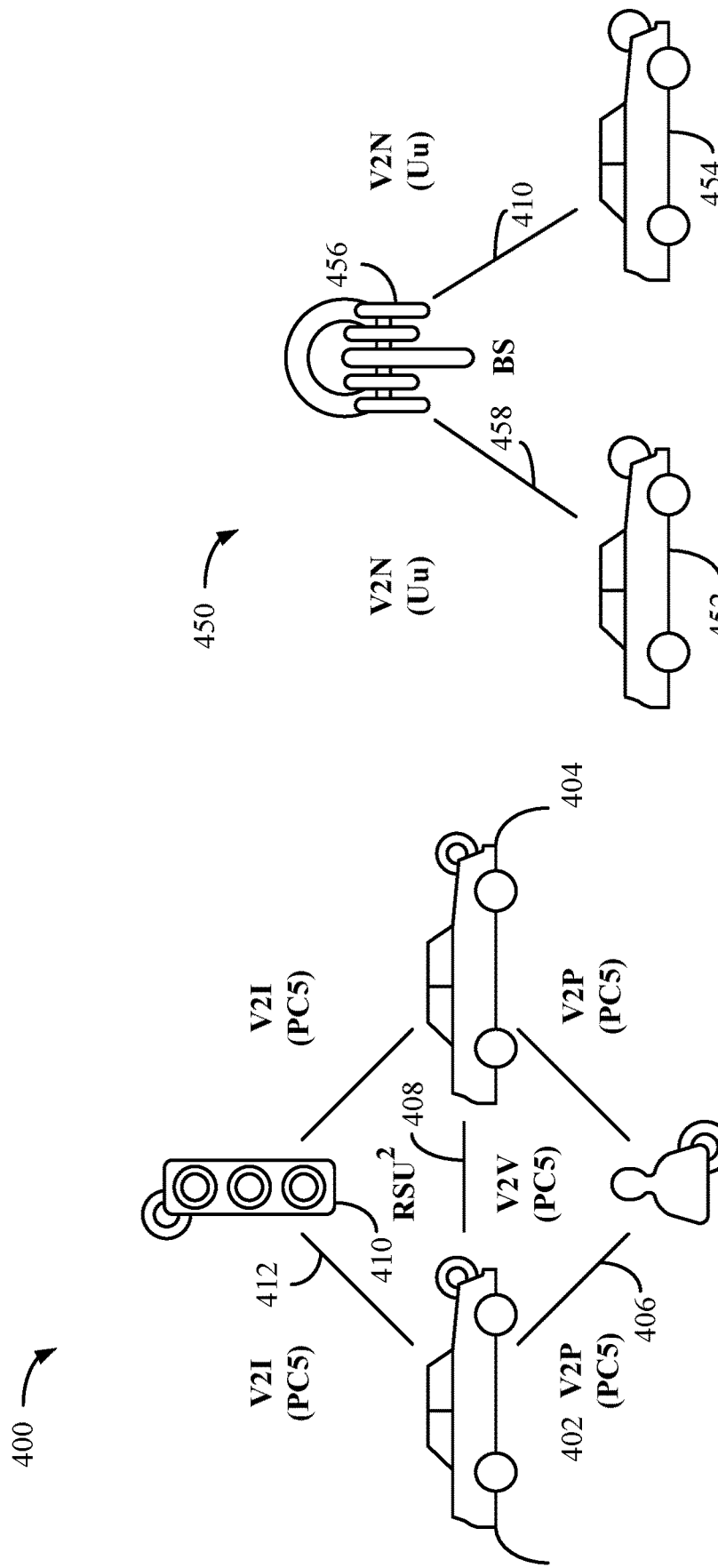
FIG. 4A and FIG. 4B show diagrammatic representations of example vehicle to everything (V2X) systems, in accordance with certain aspects of the present disclosure.

FIG. 4A and FIG. 4B show diagrammatic representations of example V2X systems, in accordance with some aspects of the present disclosure. For example, the vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. In some cases, the vehicles 402 and 404 may be considered, or include, user equipments, such as UEs 120a and 120b. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. In some cases, the vehicles 452 and 454 may be considered, or include, user equipments, such as UEs 120a and 120b. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Certain aspects of the present disclosure generally relate to techniques for CSI forwarding. In particular, certain aspects of the present disclosure provide advantages for improved sidelink communication reduce interference on uplink and enable spatial multiplexing.

Figure 5:
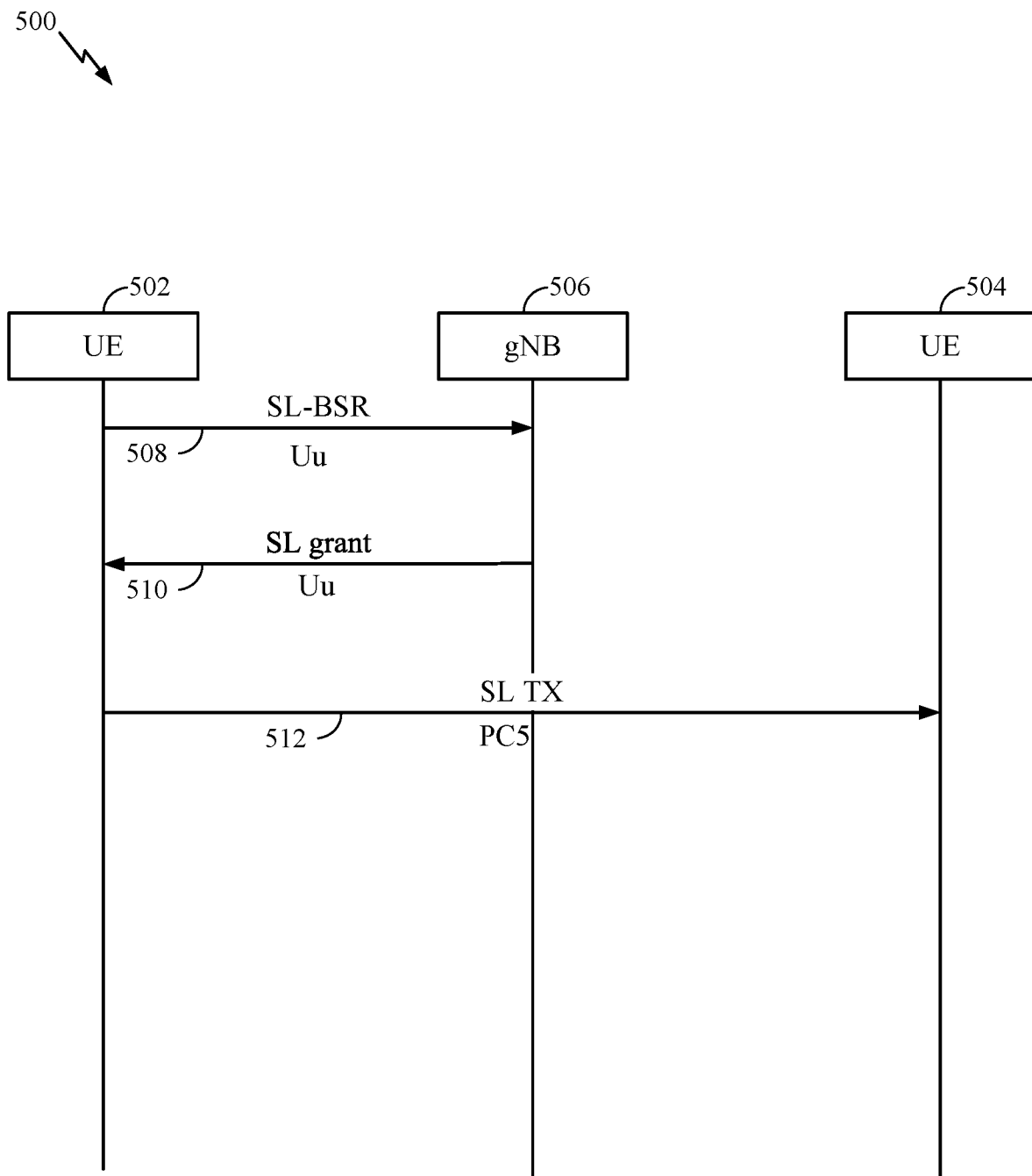
FIG. 5 is a call flow diagram illustrating example resource allocation for sidelink transmission, in accordance with certain aspects of the present disclosure.

In one resource allocation mode (e.g., sidelink resource allocation Mode 1), a serving gNB allocates sidelink resources for sidelink transmission. As shown in FIG. 5, the UE 502 may send a sidelink buffer status report (SL-BSR) at 508 to the serving gNB 506 (e.g., via Uu). The SL-BSR provides the serving gNB 506 with information about sidelink data volume of logical channel identifiers (LDICs) to each destination ID. The gNB 506 receives the SL-BSR and provides a SL grant, at 510, to the UE 502 allocated resources for sidelink transmission from the transmitting UE 502 to the receiving UE 504. At 512, the UE 502 sends a SL transmission (e.g., via PC5) to the UE 504 using the granted resources.

Figure 6:
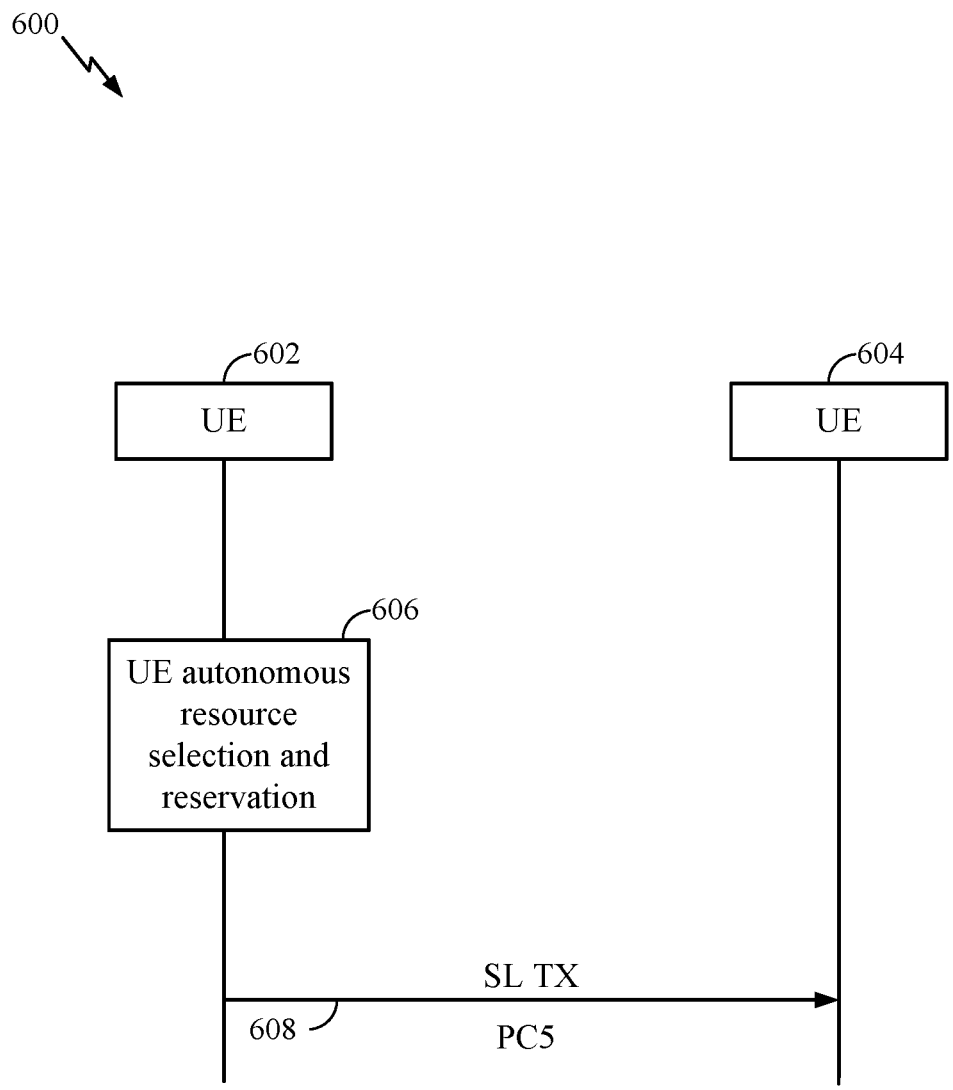
FIG. 6 is a call flow diagram illustrating example autonomous resource selection for sidelink transmission, in accordance with certain aspects of the present disclosure.

In another resource allocation mode (e.g., sidelink resource allocation Mode 2), the UEs may autonomously select sidelink resources (e.g., time and/or frequency resources). As shown in FIG. 6, at 606, a transmitting UE 602 autonomously selects and reserves resources for sidelink transmission. At 608, the transmitting UE 602 sends a SL transmission to the receiving UE 604 using the autonomously selected resources (e.g., via PC5).

Example Techniques for Reducing Inter-Vehicle Interference

Recent advances in automotive electronics has led to rapidly expanding applications such as advanced driver assistance, safety features, infotainment services, and the like. Supporting these features demands deployment of an ever-increasing number of electronic control units (ECU) and their associated distributed network of sensors, streaming units, radars, and the like. Interconnections of such components within vehicles imposes extensive and complex wiring infrastructure, such that at present day wiring harnesses for such interconnections between components may weigh as much as 60 kilograms. Furthermore, such interconnections between components impose challenges with increased design complexity and production steps.

Accordingly, the possibility of replacing or reducing the wires in these wiring harnesses, by introducing a wireless in-vehicle network, is quite attractive in many aspects ranging from reducing cost to improving fuel efficiency and design flexibility. However, one of the main challenges of wireless in-vehicle networks, as compared to traditional wired networks, is inter-vehicle interference and the detrimental effect on intra-vehicle communication. For example, if multiple vehicles that are equipped with in-vehicle wireless network operate on the same frequency band and are within close proximity to each other, each vehicle may cause harmful interference to other vehicles with in-vehicle wireless networks, which can lead to detrimental effects on data reception at the processing unit of these interfered vehicles. Further, the problem of inter-vehicle interference becomes even more of concern when the vehicle is in driving mode, since such interference may lead to incorrect or corrupt data being received from the vehicle's sensors and cameras and around the car, leading to harmful moves/actions made by the vehicle.

Accordingly, aspects of the present disclosure provide techniques for reducing inter-vehicle interference in scenarios where vehicles operate intra-vehicle wireless networks. For example, in some cases, such techniques may involve allocating different resources to sensors located in corresponding portions of two close-proximity vehicles that include intra-vehicle networks. In other words, the techniques presented herein may involve allocating resources to one or more sensors within a first vehicle such that the effect of inter-vehicle interference caused by neighboring vehicle communication on the intra-vehicle communication of the first vehicle is reduced.

Figure 7:
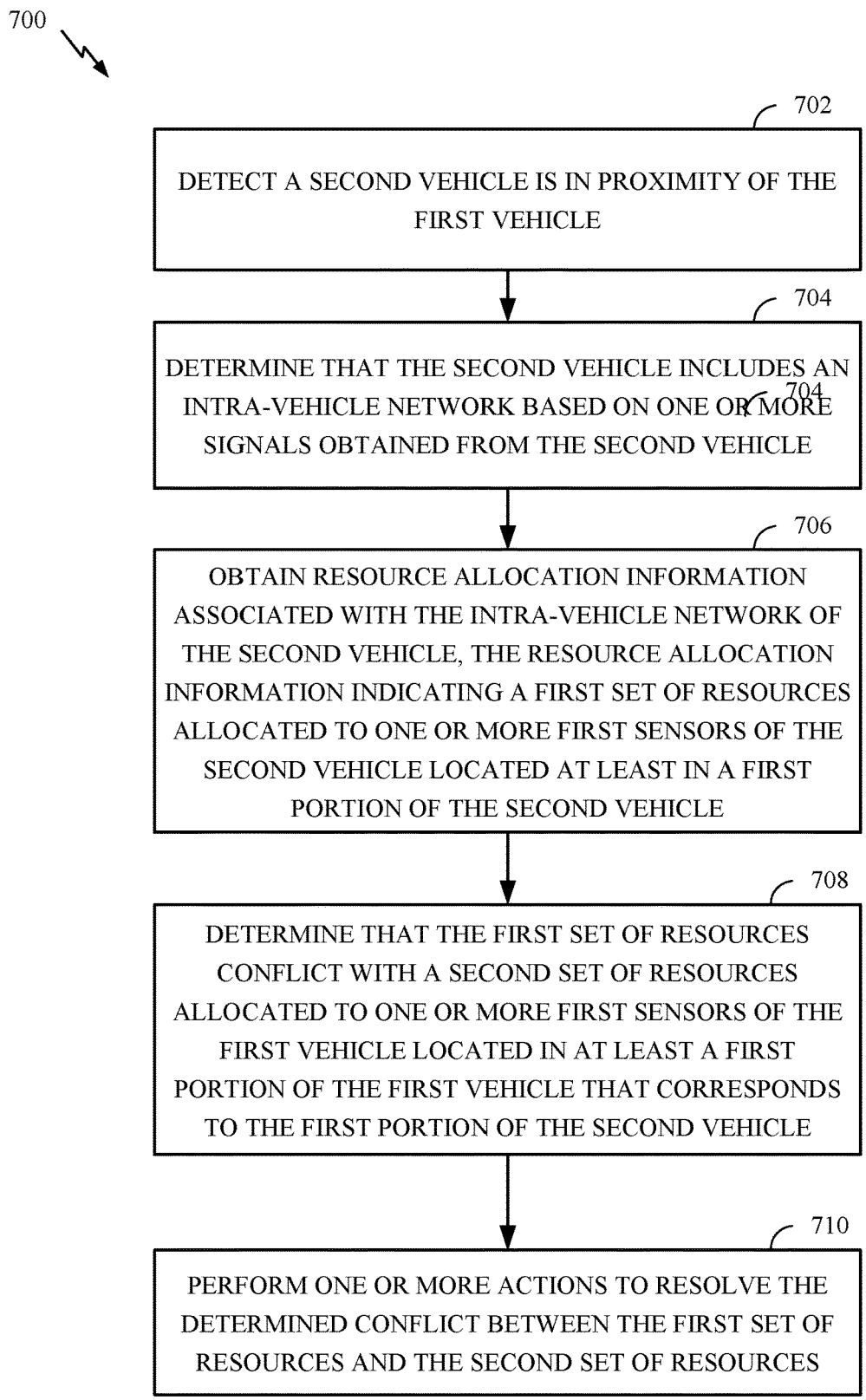
FIG. 7 is a flow diagram illustrating example operations for wireless communication by a first vehicle, in accordance with certain aspects of the present disclosure.

FIG. 7 is a flow diagram illustrating example operations 700 for wireless communication, in accordance with certain aspects of the present disclosure. The operations 700 may be performed, for example, by a sidelink (SL) device (e.g., the UE 120*a* and/or the UE 120*b* in the wireless communication network 100). In some cases, the SL device may include or comprise a first vehicle, such as one of the vehicles 402, 404, 452, and/or 454, described above. The operations 700 may be implemented as software components that are executed and run on a processing system including one or more processors (e.g., controller/processor 280 of FIG. 2). Further, the transmission and reception of signals by the apparatus in operations 700 may be enabled, for example, by one or more antennas (e.g., antennas 252 of FIG. 2). In certain aspects, the transmission and/or reception of signals by the apparatus may be implemented via a bus interface of one or more processors (e.g., controller/processor 280) obtaining and/or outputting signals.

The operations 700 may begin, at block 702, by detecting a second vehicle is in proximity of the first vehicle.

At block 704, the first vehicle determines that the second vehicle includes an in-vehicle network based on one or more signals received from the second vehicle.

At block 706, the first vehicle obtains resource allocation information associated with the in-vehicle network of the second vehicle, the resource allocation information indicating a first set of resources allocated to one or more first sensors of the second vehicle located at least in a first portion of the second vehicle.

At block 708, the first vehicle determines that the first set of resources conflict with a second set of resources allocated to one or more first sensors of the first vehicle located in at least a first portion of the first vehicle that corresponds to the first portion of the second vehicle.

At block 710, the first vehicle performs one or more actions to resolve the determined conflict between the first set of resources and the second set of resources.

In some cases, vehicles may equipped with large numbers of sensors (e.g., cameras, radar, and like devices) that allow these vehicles to detect and sense the environment and objects around them, enabling an autonomous driving experience. These vehicles may be equipped with an intra-vehicle wireless network for facilitating wireless communication between these sensors and a central control unit. The central control unit may take input from the one or more sensors and autonomously control various actions of the vehicle, such as steering, accelerating, braking, and the like. Additionally, in some cases, the central control unit may include a scheduler that schedules wireless resources (e.g., time and/or frequency resources) for communication between the one or more sensors and the central control unit. Such communication and resources must adhere to certain reliability standards (e.g., quality of service (QoS), latency requirements, etc.) to ensure the proper functioning of autonomous control over the vehicle (e.g., to minimize the likelihood the vehicle crashes).

However, as noted, there may be scenarios in which a vehicle's intra-vehicle wireless network may negatively interact with an intra-vehicle wireless network of another vehicle. One such scenario is illustrated in FIG. 8.

Figure 8:
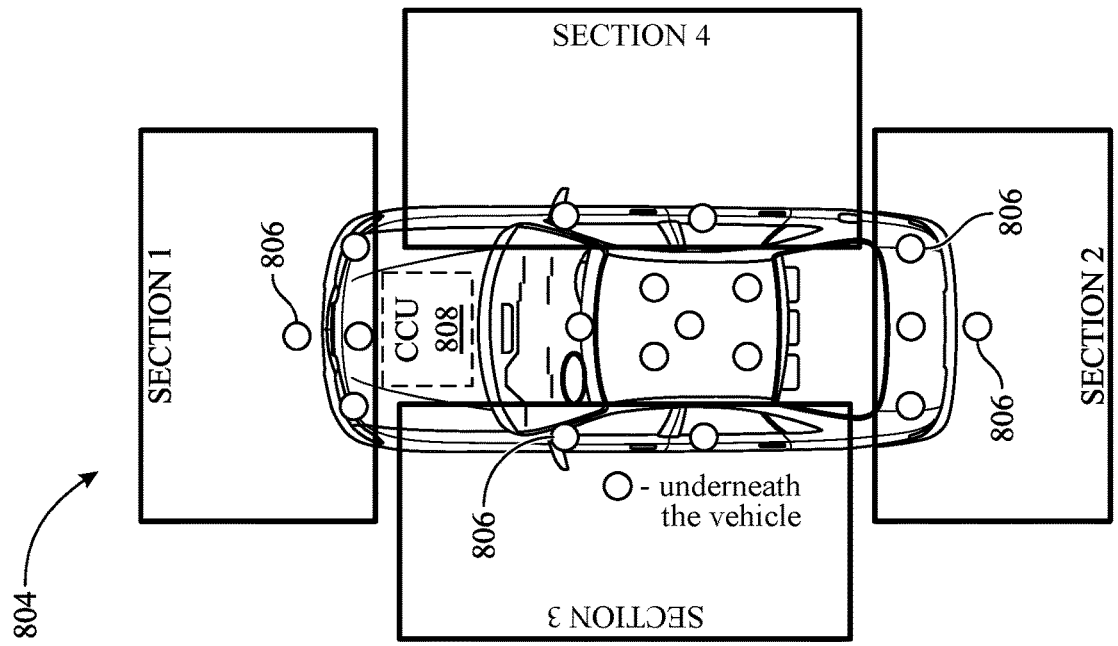
FIG. 8 illustrates a scenario in which inter-vehicle interference may occur between a first vehicle and a second vehicle, in accordance with aspects of the present disclosure.
Figure 8:
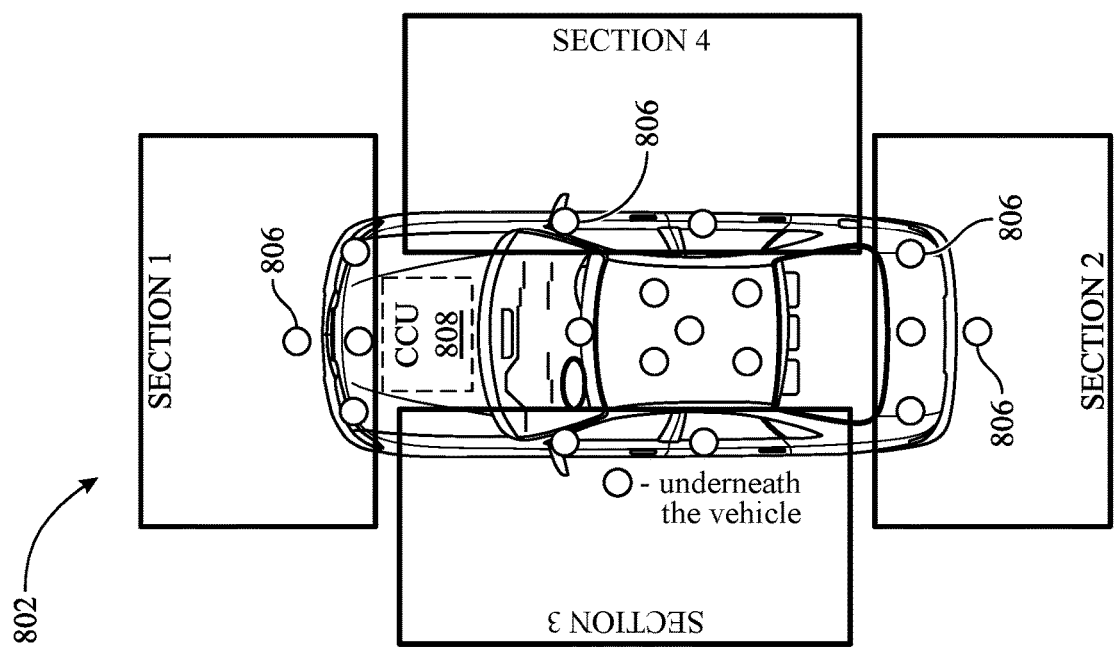

For example, FIG. 8 illustrates a scenario in which a first vehicle 802 that includes an intra-vehicle wireless network is in close proximity (e.g., within a threshold distance) to a second vehicle 804 that also includes an intra-vehicle wireless network. The first vehicle 802 and second vehicle 804 may include one or more sensors 806 that may be located in various portions of each vehicle, such as sections 1-4 of each vehicle. As noted, the one or more sensors may include devices such as cameras, radar, and the like. Each of these sensors 806 may wirelessly communicate with a central control unit (CCU) 808 of their respective vehicle, forming the intra-vehicle wireless network of the vehicle. To facilitate such communication, the CCU 808 may include a scheduler that allocates/schedules resources (e.g., time and/or frequency resources) for the one or more sensors to transmit and/or receive data. The scheduler may schedule such resources in a fashion that ensures the data from all sensors are received with lowest possible latency while maintaining high reliability/QoS by allocating the resources appropriately.

However, in certain cases, the transmission/reception of data of one or more sensors 806 of the first vehicle 802 conflict with the transmission/reception of data of one or more sensors 806 of the second vehicle 804. For example, in some cases, when the first vehicle 802 is in close proximity to the second vehicle 804 (e.g., within a threshold distance), as illustrated, the sensors 806 in section 4 of the first vehicle 802 may interfere with the sensors 806 in section 3 of the second vehicle 804 or vice versa. Such interference may occur when the sensors 806 in section 4 of the first vehicle 802 are allocated a same set of resources (e.g., time and/or frequency resources) as the sensors 806 in section 3 of the second vehicle 804 such that the resources allocated to each of the sensors 806 in the first vehicle 802 and second vehicle 804 overlap in time and/or frequency.

Accordingly, to resolve such conflict between resources and reduce inter-vehicle interference, the first vehicle 802 (e.g., the scheduler in the first vehicle 802) may take into account resource allocation information of a second vehicle 804 that is determined to be in close proximity. More specifically, for example, to resolve such conflict between resources and reduce inter-vehicle interference, different sets of resources (or resource patterns) may be allocated to sensors located on vehicles in close proximity of each other, which will be explained in greater detail below.

For example, such techniques for reducing inter-vehicle interference may begin by the first vehicle 802 detecting that the second vehicle 804 is in proximity to the first vehicle 802. In some cases, the first vehicle 802 may detect the second vehicle 804 is in proximity of the first vehicle 802 by detecting that the second vehicle 804 is within a threshold distance away from the first vehicle. Accordingly, if the first vehicle 802 detects that the second vehicle 804 is in proximity to the first vehicle 802, the first vehicle may then determine whether the second vehicle 804 includes or operates an intra-vehicle wireless network based on one or more signals received from the second vehicle 804. In some cases, the first vehicle 802 may obtain the one or more signals via a sidelink communication associated with at least one of Long Term Evolution (LTE) technology or 5G New Radio technology or via a dedicated short range communication (DSRC). For example, in some cases, the first vehicle 802 may attempt to establish a connection with the second vehicle 804, such as a sidelink V2V/V2X connection over a PC5 interface, as described above. If the first vehicle 802 is able to establish the connection with the second vehicle 804, the first vehicle 802 may request network configuration information from that second vehicle 804 indicating whether the second vehicle 804 includes an intra-vehicle wireless network.

Thereafter, if the first vehicle 802 determines that the second vehicle 804 includes or operates an intra-vehicle wireless network (e.g., based on the network configuration information from the second vehicle 804), the first vehicle 802 may obtain resource allocation information associated with the intra-vehicle network of the second vehicle. In some cases, the resource allocation information may indicate a first set of resources allocated to one or more first sensors 806 of the second vehicle 804 located at least in a first portion (e.g., section 3) of the second vehicle 804.

In some cases, the first vehicle 802 may obtain the resource allocation information associated with the intra-vehicle network of the second vehicle by establishing a connection with the second vehicle and providing a request for transmission to the second vehicle for the resource allocation information. Accordingly, the first vehicle 802 may obtain the resource allocation information from the second vehicle in response to the request. In some cases, the connection may include a V2V/V2X connection over a PC5 interface and the first vehicle 802 may establish the connection if such connection was not already established.

In some cases, the first vehicle 802 may request the resource allocation information from the second vehicle 804 based on a determination that one or more first sensors 806 of the second vehicle 804 have the potential to cause interference to one or more first sensors 806 of the first vehicle 802. For example, in some cases, the first vehicle 802 may determine that the one or more first sensors 806 of the second vehicle 804 located at least in the first portion of the second vehicle 804 have the potential to cause interference to the one or more first sensors 806 of the first vehicle 802 located in at least the first portion of the first vehicle 802 based, at least in part, on a proximity of the one or more first sensors of the second vehicle to the one or more first sensors of the first vehicle.

For example, in some cases, the first vehicle 802 may determine that one or more first sensors 806 located in section 3 of the second vehicle 804 have the potential to cause interference to one or more first sensors 806 in section 4 of the first vehicle 804 or vice versa. Such determination may be based on a distance between the one or more first sensors 806 located in section 4 of the first vehicle 802 and the one or more first sensors 806 located in section 3 of the second vehicle 804. More specifically, for example, if the one or more first sensors 806 located in section 4 of the first vehicle 802 are within a threshold distance from the one or more first sensors 806 located in section 3 of the second vehicle 804, the first vehicle 802 may determine that the one or more first sensors 806 located in section 3 of the second vehicle 804 have the potential cause interference the one or more first sensors 806 located in section 4 of the first vehicle 802 (or that the one or more first sensors 806 located in section 4 of the first vehicle 802 have the potential to be interfered by the one or more first sensors 806 located in section 3 of the second vehicle 804).

Accordingly, based on the determination that the one or more first sensors 806 of the second vehicle 804 have the potential to cause interference to the one or more first sensors 806 of the first vehicle 802, the first vehicle 802 may provide signaling for transmission to the second vehicle 802. Such signaling, which may be included in the request for the resource allocation information described above, may include at least a first request for the first set of resources allocated to the one or more first sensors 806 of the second vehicle 804 located at least in the first portion of the second vehicle (e.g., section 3).

In some cases, the first vehicle may determine one or more additional sensors 806 of the second vehicle 804 located in a second portion of the second vehicle 804 have the potential to cause interference to the one or more first sensors 806 of the first vehicle 802 located in at least the first portion of the first vehicle 802 or one or more additional sensors 806 of the first vehicle 802 located in a second portion of the first vehicle 802. In some cases, such determinations may be based, at least in part, on a proximity of the one or more first sensors of the second vehicle to at least one of the one or more first sensors of the first vehicle or the one or more additional sensors of the first vehicle. For example, in some cases, the first vehicle 802 may determine that one or more additional sensors 806 of the second vehicle 804 located in section 1 and/or section 2 of the second vehicle 804 have the potential to cause interference to the one or more sensors 806 of the first vehicle 802 located section 4 of the first vehicle 802 and/or one or more additional sensors 806 of the first vehicle 802 located in an additional portion of the first vehicle 802, such as sections 1 and/or 2 of the first vehicle 802.

Accordingly, based on the determination that the one or more additional sensors 806 of the second vehicle 804 located in a second portion of the second vehicle 804 have the potential to cause interference to the one or more first sensors 806 of the first vehicle 802 located in at least the first portion of the first vehicle 802 or one or more additional sensors 806 of the first vehicle 802 located in a second portion of the first vehicle 802, the first vehicle 802 may provide signaling for transmission to the second vehicle 804 that includes a second request for a third set of resources allocated to the one or more additional sensors 806 of the second vehicle 804 located in the second portion of the second vehicle 804 that have the potential to cause interference to the one or more first sensors 806 of the first vehicle 802 located in the second portion of the first vehicle 802 or the one or more additional sensors 806 of the first vehicle 802 located in the second portion of the first vehicle 802.

As noted, in response to the signaling requesting the first set of resources allocated to the one or more first sensors 806 located in the first portion of the second vehicle 804 and/or requesting the third set of resources allocated to the one or more additional sensors 806 located in the second portion of the second vehicle 804, the first vehicle 802 may receive the resource allocation information from the second vehicle 804, including an indication of the first set of resources and/or third set of resources.

Thereafter, the first vehicle 802 may determine whether the first set of resources conflict with a second set of resources allocated to the one or more first sensors 806 of the first vehicle 802 located in at least the first portion of the first vehicle 802 that corresponds to the first portion of the second vehicle 804. For example, in some cases, the first vehicle 802 may determine whether the first set of resources allocated to the one or more first sensors 806 located in section 3 of the second vehicle 804 conflict with the second set of resources allocated to the one or more first sensors 806 located in section 4 of the first vehicle 802 corresponding to section 3 of the second vehicle 804.

Additionally, in some cases, the first vehicle 802 may determine whether the third set of resources allocated to the one or more additional sensors 806 located in the second portion of the second vehicle (e.g., section 1 and/or 2 of the second vehicle 804) conflict with the second set of resources allocated to the one or more sensors 806 located in the first portion of the first vehicle 802 (e.g., section 4 of the first vehicle 802) or resources allocated to the one or more additional sensors 806 of the first vehicle 802 located in the second portion of the first vehicle 802 (e.g., sections 1 and/or 2 of the first vehicle 802).

In some cases, the first vehicle 802 may determine that the first set of resources allocated to the one or more first sensors 806 located in the first portion of the second vehicle 804 conflict with the second set of resources allocated to the one or more first sensors 806 located in the first portion of the first vehicle 802 by determining that at least one of time resources or frequency resources of the first set of resources overlaps at least one of time resources or frequency resources of the second set of resources.

If the first vehicle 802 does not detect a conflict, the first vehicle 802 may take no further action regarding attempting to reduce inter-vehicle interference as the one or more first sensors 806 located in the first portion of the second vehicle 804 and the one or more first sensors 806 located in the first portion of the first vehicle 802 will not interfere with each other since there is no conflict between the first set of resources and the second set of resources.

However, if the first vehicle 802 determines that the first set of resources allocated to the one or more first sensors 806 of the second vehicle 804 conflict with the second set of resources allocated to one or more first sensors 806 of the first vehicle 802, the first vehicle 802 may perform one or more actions to resolve the determined conflict between the first set of resources and the second set of resources.

For example, in some cases, the first vehicle 802 may perform the one or more actions to resolve the determined conflict between the first set of resources and the second set of resources by selecting a new set of resources, for the one or more first sensors 806 of the first vehicle 802 located in the first portion of the first vehicle 802 (and in any additional portion of the first vehicle 802 with a determined conflict), that do not overlap at least one of the time resources or frequency resources of the first set of resources allocated to one or more first sensors 806 of the second vehicle 802 located in the first portion of the second vehicle 804 (and in any additional portion of the second vehicle 804). Thereafter, upon selecting the new, non-overlapping resources, the first vehicle 802 may operate (e.g., transmit/receive data) the one or more first sensors 806 located in the first portion of the first vehicle 802 by using the new, non-overlapping set of resources at least during a period of time in which the second vehicle 804 is in proximity of the first vehicle 802.

Further, in some cases, the first vehicle 802 may additionally attempt to reduce inter-vehicle interference and resolve the determined conflict between the first set of resources and the second set of resources by reducing a transmission power associated with the new, non-overlapping resources allocated to the one or more first sensors located in the first portion of the first vehicle. For example, reducing the transmission power associated with the new, non-overlapping resources allocated to the one or more first sensors may prevent wireless signals to/from the one or more first sensors 806 located in the first portion of the first vehicle 802 from interfering with sensors 806 of any neighboring vehicles (e.g., such wireless signals would attenuate in the air before reaching these neighboring vehicles).

In other cases, the first vehicle 802 may perform the one or more actions to resolve the determined conflict between the first set of resources and the second set of resources by transmitting signaling to the second vehicle 804 requesting the second vehicle 804 to select a new set of resources, for the one or more first sensors 806 of the second vehicle 804 located in the first portion of the second vehicle 804, that do not overlap at least one of the time resources or frequency resources of the second set of resources allocated to the one or more first sensors 806 of the first vehicle 802. In other words, the first vehicle 802 may request that the second vehicle change the set of resources allocated to the one or more first sensors 806 located in the first portion of the second vehicle such that these resources do not overlap with the second set of resources allocated to the one or more first sensors 806 located in the first portion of the first vehicle 802. In some cases, such request may be transmitted over the established sidelink V2V/V2X connection on the PC5 interface between the first vehicle 802 and the second vehicle 804.

Figure 9:
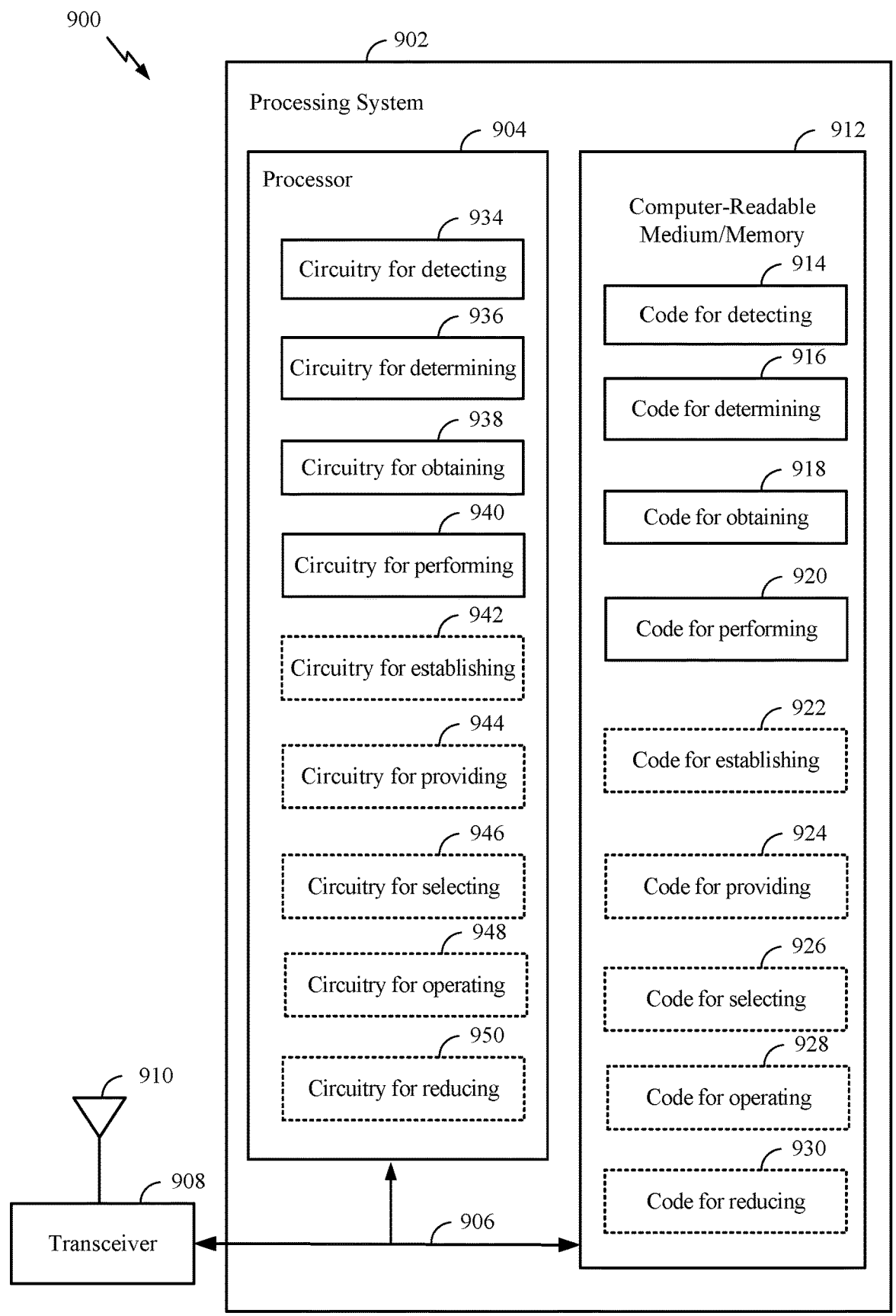
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for reducing inter-vehicle interference. In certain aspects, computer-readable medium/memory 912 stores code 914 for detecting; code 916 for determining; code 918 for obtaining; code 920 for performing; code 922 for establishing; code 924 for providing; code 926 for selecting; code 928 for operating; code 930 for reducing.

In some cases, code 914 for detecting may include code for detecting a second vehicle is in proximity of the first vehicle. Additionally, in some cases, the code 914 for detecting the second vehicle is in proximity of the first vehicle may include code for detecting that the second vehicle is within a threshold distance away from the first vehicle.

Additionally, in some cases, the code 916 for determining may include code for determining that the second vehicle includes an intra-vehicle network based on one or more signals received from the second vehicle.

Additionally, in some cases, the code 918 for obtaining may include code for obtaining resource allocation information associated with the intra-vehicle network of the second vehicle, the resource allocation information indicating a first set of resources allocated to one or more first sensors of the second vehicle located at least in a first portion of the second vehicle.

Additionally, in some cases, the code 916 for determining may include code for determining that the first set of resources conflict with a second set of resources allocated to one or more first sensors of the first vehicle located in at least a first portion of the first vehicle that corresponds to the first portion of the second vehicle.

Additionally, in some cases, the code 920 for performing may include code for performing one or more actions to resolve the determined conflict between the first set of resources and the second set of resources.

Additionally, in some cases, the code 922 for establishing may include code for establishing a connection with the second vehicle.

Additionally, in some cases, the code 924 for providing may include code for providing a request for transmission to the second vehicle for the resource allocation information.

Additionally, in some cases, the code 918 for obtaining may include code for obtaining the resource allocation information from the second vehicle in response to the request.

Additionally, in some cases, the code 916 for determining may include code for determining that the one or more first sensors of the second vehicle located at least in the first portion of the second vehicle have the potential to cause interference to the one or more first sensors of the first vehicle located in at least the first portion of the first vehicle based, at least in part, on a proximity of the one or more first sensors of the second vehicle to the one or more first sensors of the first vehicle.

Additionally, in some cases, the code 924 for providing may include code for providing, based on the determination that the one or more first sensors of the second vehicle have the potential to cause interference to the one or more first sensors of the first vehicle, signaling for transmission to the second vehicle, said signaling including at least a first request for the first set of resources allocated to the one or more first sensors of the second vehicle located at least in the first portion of the second vehicle.

Additionally, in some cases, the code 916 for determining may include code for determining one or more additional sensors of the second vehicle located in a second portion of the second vehicle have the potential to cause interference to the one or more first sensors of the first vehicle located in at least the first portion of the first vehicle or one or more additional sensors of the first vehicle located in a second portion of the first vehicle based, at least in part, on a proximity of the one or more first sensors of the second vehicle to at least one of the one or more first sensors of the first vehicle or the one or more additional sensors of the first vehicle.

Additionally, in some cases, the code 916 for determining that the first set of resources conflict with the second set of resources further comprise code for determining that at least one of time resource or frequency resource of the first set of resources overlaps at least one of time resource or frequency resource of the second set of resources.

Additionally, in some cases, the code 926 for selecting may include code for selecting a third set of resources, for the one or more first sensors of the first vehicle, that do not overlap at least one of the time resource or frequency resource of the first set of resources allocated to one or more first sensors of the second vehicle.

Additionally, in some cases, the code 928 for operating may include code for operating the one or more first sensors of the first vehicle by using the third set of resources at least during a period of time in which the second vehicle is in proximity of the first vehicle.

Additionally, in some cases, the code 930 for reducing may include code for reducing a transmission power associated with the third set of resources allocated to the one or more first sensors located in the first portion of the first vehicle.

Additionally, in some cases, the code 924 for providing may include code for providing signaling to the second vehicle requesting the second vehicle to select a third set of resources, for the one or more first sensors of the second vehicle, that do not overlap at least one of the time resource or frequency resource of the second set of resources allocated to the one or more first sensors of the first vehicle.

Additionally, in certain aspects, the processor 904 has circuitry configured to implement the code stored in the computer-readable medium/memory 912. For example, the processor 904 includes circuitry 934 for detecting; circuitry 936 for determining; circuitry 938 for obtaining; circuitry 940 for performing; circuitry 942 for establishing; circuitry 944 for providing; circuitry 946 for selecting; circuitry 948 for operating; circuitry 950 for reducing.

In some cases, circuitry 934 for detecting may include circuitry for detecting a second vehicle is in proximity of the first vehicle. Additionally, in some cases, the circuitry 934 for detecting the second vehicle is in proximity of the first vehicle may include circuitry for detecting that the second vehicle is within a threshold distance away from the first vehicle.

Additionally, in some cases, the circuitry 936 for determining may include circuitry for determining that the second vehicle includes an intra-vehicle network based on one or more signals received from the second vehicle.

Additionally, in some cases, the circuitry 938 for obtaining may include circuitry for obtaining resource allocation information associated with the intra-vehicle network of the second vehicle, the resource allocation information indicating a first set of resources allocated to one or more first sensors of the second vehicle located at least in a first portion of the second vehicle.

Additionally, in some cases, the circuitry 936 for determining may include circuitry for determining that the first set of resources conflict with a second set of resources allocated to one or more first sensors of the first vehicle located in at least a first portion of the first vehicle that corresponds to the first portion of the second vehicle.

Additionally, in some cases, the circuitry 940 for performing may include circuitry for performing one or more actions to resolve the determined conflict between the first set of resources and the second set of resources.

Additionally, in some cases, the circuitry 942 for establishing may include circuitry for establishing a connection with the second vehicle.

Additionally, in some cases, the circuitry 944 for providing may include circuitry for providing a request for transmission to the second vehicle for the resource allocation information.

Additionally, in some cases, the circuitry 938 for obtaining may include circuitry for obtaining the resource allocation information from the second vehicle in response to the request.

Additionally, in some cases, the circuitry 936 for determining may include circuitry for determining that the one or more first sensors of the second vehicle located at least in the first portion of the second vehicle have the potential to cause interference to the one or more first sensors of the first vehicle located in at least the first portion of the first vehicle based, at least in part, on a proximity of the one or more first sensors of the second vehicle to the one or more first sensors of the first vehicle.

Additionally, in some cases, the circuitry 944 for providing may include circuitry for providing, based on the determination that the one or more first sensors of the second vehicle have the potential to cause interference to the one or more first sensors of the first vehicle, signaling for transmission to the second vehicle, said signaling including at least a first request for the first set of resources allocated to the one or more first sensors of the second vehicle located at least in the first portion of the second vehicle.

Additionally, in some cases, the circuitry 936 for determining may include circuitry for determining one or more additional sensors of the second vehicle located in a second portion of the second vehicle have the potential to cause interference to the one or more first sensors of the first vehicle located in at least the first portion of the first vehicle or one or more additional sensors of the first vehicle located in a second portion of the first vehicle based, at least in part, on a proximity of the one or more first sensors of the second vehicle to at least one of the one or more first sensors of the first vehicle or the one or more additional sensors of the first vehicle.

Additionally, in some cases, the circuitry 936 for determining that the first set of resources conflict with the second set of resources further comprise circuitry for determining that at least one of time resource or frequency resource of the first set of resources overlaps at least one of time resource or frequency resource of the second set of resources.

Additionally, in some cases, the circuitry 946 for selecting may include circuitry for selecting a third set of resources, for the one or more first sensors of the first vehicle, that do not overlap at least one of the time resource or frequency resource of the first set of resources allocated to one or more first sensors of the second vehicle.

Additionally, in some cases, the circuitry 948 for operating may include circuitry for operating the one or more first sensors of the first vehicle by using the third set of resources at least during a period of time in which the second vehicle is in proximity of the first vehicle.

Additionally, in some cases, the circuitry 950 for reducing may include circuitry for reducing a transmission power associated with the third set of resources allocated to the one or more first sensors located in the first portion of the first vehicle.

Additionally, in some cases, the circuitry 944 for providing may include circuitry for providing signaling to the second vehicle requesting the second vehicle to select a third set of resources, for the one or more first sensors of the second vehicle, that do not overlap at least one of the time resource or frequency resource of the second set of resources allocated to the one or more first sensors of the first vehicle.

EXAMPLE ASPECTS

Aspect 1: A method for wireless communications by a first vehicle, comprising: detecting a second vehicle is in proximity of the first vehicle; determining that the second vehicle includes an intra-vehicle network based on one or more signals obtained from the second vehicle; obtaining resource allocation information associated with the intra-vehicle network of the second vehicle, the resource allocation information indicating a first set of resources allocated to one or more first sensors of the second vehicle located at least in a first portion of the second vehicle; determining that the first set of resources conflict with a second set of resources allocated to one or more first sensors of the first vehicle located in at least a first portion of the first vehicle that corresponds to the first portion of the second vehicle; and performing one or more actions to resolve the determined conflict between the first set of resources and the second set of resources.

Aspect 2: The method of Aspect 1, wherein the detection comprises detecting that the second vehicle is within a threshold distance away from the first vehicle.

Aspect 3: The method of any one of Aspects 1-2, further comprising obtaining the one or more signals from the second vehicle via a sidelink communication associated with at least one of Long Term Evolution (LTE) technology or 5G New Radio technology or via a dedicated short range communication (DSRC).

Aspect 4: The method of any one of Aspects 1-3, wherein the obtaining the resource allocation information associated with the intra-vehicle network of the second vehicle comprises: establishing a connection with the second vehicle; providing a request for transmission to the second vehicle for the resource allocation information; and obtaining the resource allocation information from the second vehicle in response to the request.

Aspect 5: The method of Aspect 4, wherein the connection comprises a vehicle-to-vehicle connection over a PC5 interface.

Aspect 6: The method of any one of Aspects 1-5, further comprising determining that the one or more first sensors of the second vehicle located at least in the first portion of the second vehicle have the potential to cause interference to the one or more first sensors of the first vehicle located in at least the first portion of the first vehicle based, at least in part, on a proximity of the one or more first sensors of the second vehicle to the one or more first sensors of the first vehicle.

Aspect 7: The method of Aspect 6, further comprising: based on the determination that the one or more first sensors of the second vehicle have the potential to cause interference to the one or more first sensors of the first vehicle, providing signaling for transmission to the second vehicle, said signaling including at least a first request for the first set of resources allocated to the one or more first sensors of the second vehicle located at least in the first portion of the second vehicle.

Aspect 8: The method of Aspect 7, further comprising determining one or more additional sensors of the second vehicle located in a second portion of the second vehicle have the potential to cause interference to the one or more first sensors of the first vehicle located in at least the first portion of the first vehicle or one or more additional sensors of the first vehicle located in a second portion of the first vehicle based, at least in part, on a proximity of the one or more first sensors of the second vehicle to at least one of the one or more first sensors of the first vehicle or the one or more additional sensors of the first vehicle.

Aspect 9: The method of Aspect 7, wherein the signaling further comprises a second request for a third set of resources allocated to the one or more additional sensors of the second vehicle located in the second portion of the second vehicle that have the potential to cause interference to the one or more first sensors of the first vehicle located in the second portion of the first vehicle or the one or more additional sensors of the first vehicle located in the second portion of the first vehicle.

Aspect 10: The method of any one of Aspects 1-9, wherein the determination that the first set of resources conflict with the second set of resources comprises determining that at least one of time resource or frequency resource of the first set of resources overlaps at least one of time resource or frequency resource of the second set of resources.

Aspect 11: The method of any one of Aspects 1-10, wherein the performance of the one or more actions to resolve the determined conflict between the first set of resources and the second set of resources comprises selecting a third set of resources, for the one or more first sensors of the first vehicle, that do not overlap at least one of the time resource or frequency resource of the first set of resources allocated to one or more first sensors of the second vehicle.

Aspect 12: The method of Aspect 11, further comprising operating the one or more first sensors of the first vehicle by using the third set of resources at least during a period of time in which the second vehicle is in proximity of the first vehicle.

Aspect 13: The method of Aspect 11, further comprising reducing a transmission power associated with the third set of resources allocated to the one or more first sensors located in the first portion of the first vehicle.

Aspect 14: The method of Aspect 10, wherein the performance of the one or more actions to resolve the determined conflict between the first set of resources and the second set of resources comprises providing signaling to the second vehicle requesting the second vehicle to select a third set of resources, for the one or more first sensors of the second vehicle, that do not overlap at least one of the time resource or frequency resource of the second set of resources allocated to the one or more first sensors of the first vehicle.

Aspect 15: The method of any one of claims 1-14, wherein the one or more actions comprise reducing a transmission power associated with the second set of resources or requesting the second vehicle to reduce a transmission power associated with the first set of resources.

Aspect 16: An apparatus for wireless communications, comprising means for performing the operations of one or more of Aspects 1-14.

Aspect 17: An apparatus for wireless communications, comprising a processing system including at least one processor configured to perform the operations of one or more of Aspects 1-14.

Aspect 18: A first vehicle, comprising: at least one antenna; and a processing system configured to detect, via the at least one antenna, a second vehicle is in proximity of the first vehicle, determine that the second vehicle includes an intra-vehicle network based on one or more signals obtained from the second vehicle, obtain resource allocation information associated with the intra-vehicle network of the second vehicle, the resource allocation information indicating a first set of resources allocated to one or more first sensors of the second vehicle located at least in a first portion of the second vehicle, determine that the first set of resources conflict with a second set of resources allocated to one or more first sensors of the first vehicle located in at least a first portion of the first vehicle that corresponds to the first portion of the second vehicle, and perform one or more actions to resolve the determined conflict between the first set of resources and the second set of resources.

Aspect 18: A computer-readable medium for wireless communications by a first vehicle, comprising codes executable by an apparatus to: detect a second vehicle is in proximity of the first vehicle; determine that the second vehicle includes an intra-vehicle network based on one or more signals obtained from the second vehicle; obtain resource allocation information associated with the intra-vehicle network of the second vehicle, the resource allocation information indicating a first set of resources allocated to one or more first sensors of the second vehicle located at least in a first portion of the second vehicle; determine that the first set of resources conflict with a second set of resources allocated to one or more first sensors of the first vehicle located in at least a first portion of the first vehicle that corresponds to the first portion of the second vehicle; and perform one or more actions to resolve the determined conflict between the first set of resources and the second set of resources.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a UE or BS may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120a and/or processors 220, 230, 238, and/or controller/processor 240 of the BS 110a shown in FIG. 2 may be configured to perform operations 700 of FIG. 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining, means for detecting, means for obtaining, means for performing, means for establishing, means for providing, means for selecting, means for operating and means for reducing may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software.

Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7, as well as other operations described herein for reducing inter-vehicle interference.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a first vehicle, comprising:
   a processing system configured to:
      detect a second vehicle is in proximity of the first vehicle;
      determine that the second vehicle includes an intra-vehicle network based on one or more signals obtained from the second vehicle;
      provide a request for transmission to the second vehicle for resource allocation information associated with the intra-vehicle network of the second vehicle, the resource allocation information indicating a first set of resources allocated to one or more first sensors of the second vehicle located at least in a first portion of the second vehicle;
      obtain the resource allocation information from the second vehicle in response to the request;
      determine that the first set of resources conflict with a second set of resources allocated to one or more first sensors of the first vehicle located in at least a first portion of the first vehicle that corresponds to the first portion of the second vehicle; and
      perform one or more actions to resolve the determined conflict between the first set of resources and the second set of resources.

2. The apparatus of claim 1, wherein the processing system is configured to detect the second vehicle is in proximity of the first vehicle by detecting that the second vehicle is within a threshold distance away from the first vehicle.

3. The apparatus of claim 1, wherein the processing system is further configured to obtain the one or more signals from the second vehicle via a sidelink communication associated with at least one of Long Term Evolution (LTE) technology or 5G New Radio technology or via a dedicated short range communication (DSRC).

4. The apparatus of claim 1, wherein the processing system is further configured to establish
   a connection with the second vehicle.

5. The apparatus of claim 4, wherein the connection comprises a vehicle-to-vehicle connection over a PC5 interface.

6. The apparatus of claim 1, wherein the processing system is further configured to determine that the one or more first sensors of the second vehicle located at least in the first portion of the second vehicle have the potential to cause interference to the one or more first sensors of the first vehicle located in at least the first portion of the first vehicle based, at least in part, on a proximity of the one or more first sensors of the second vehicle to the one or more first sensors of the first vehicle.

7. The apparatus of claim 6, wherein the processing system is further configured to:
   based on the determination that the one or more first sensors of the second vehicle have the potential to cause interference to the one or more first sensors of the first vehicle, provide signaling for transmission to the second vehicle, said signaling including at least a first request for the first set of resources allocated to the one or more first sensors of the second vehicle located at least in the first portion of the second vehicle.

8. The apparatus of claim 7, wherein the processing system is further configured to determine one or more additional sensors of the second vehicle located in a second portion of the second vehicle have the potential to cause interference to the one or more first sensors of the first vehicle located in at least the first portion of the first vehicle or one or more additional sensors of the first vehicle located in a second portion of the first vehicle based, at least in part, on a proximity of the one or more first sensors of the second vehicle to at least one of the one or more first sensors of the first vehicle or the one or more additional sensors of the first vehicle.

9. The apparatus of claim 7, wherein the signaling further comprises a second request for a third set of resources allocated to the one or more additional sensors of the second vehicle located in the second portion of the second vehicle that have the potential to cause interference to the one or more first sensors of the first vehicle located in the second portion of the first vehicle or the one or more additional sensors of the first vehicle located in the second portion of the first vehicle.

10. The apparatus of claim 1, wherein, at least one of:
   the processing system is configured to determine that the first set of resources conflict with the second set of resources by determining that at least one of time resource or frequency resource of the first set of resources overlaps at least one of time resource or frequency resource of the second set of resources; or the one or more actions comprise reducing a transmission power associated with the second set of resources or requesting the second vehicle to reduce a transmission power associated with the first set of resources.

11. The apparatus of claim 1, wherein the processing system is configured to perform one or more actions to resolve the determined conflict between the first set of resources and the second set of resources by selecting a third set of resources, for the one or more first sensors of the first vehicle, that do not overlap at least one of the time resource or frequency resource of the first set of resources allocated to one or more first sensors of the second vehicle.

12. The apparatus of claim 11, wherein the processing system is further configured to operate the one or more first sensors of the first vehicle by using the third set of resources at least during a period of time in which the second vehicle is in proximity of the first vehicle.

13. The apparatus of claim 11, wherein the processing system is further configured to reduce a transmission power associated with the third set of resources allocated to the one or more first sensors located in the first portion of the first vehicle.

14. The apparatus of claim 10, wherein the processing system is configured to perform one or more actions to resolve the determined conflict between the first set of resources and the second set of resources by providing signaling to the second vehicle requesting the second vehicle to select a third set of resources, for the one or more first sensors of the second vehicle, that do not overlap at least one of the time resource or frequency resource of the second set of resources allocated to the one or more first sensors of the first vehicle.

15. A method for wireless communications by a first vehicle, comprising:
   detecting a second vehicle is in proximity of the first vehicle;
   determining that the second vehicle includes an intra-vehicle network based on one or more signals obtained from the second vehicle;
   providing a request for transmission to the second vehicle for obtaining resource allocation information associated with the intra-vehicle network of the second vehicle, the resource allocation information indicating a first set of resources allocated to one or more first sensors of the second vehicle located at least in a first portion of the second vehicle;
   obtaining the resource allocation information from the second vehicle in response to the request;
   determining that the first set of resources conflict with a second set of resources allocated to one or more first sensors of the first vehicle located in at least a first portion of the first vehicle that corresponds to the first portion of the second vehicle; and
   performing one or more actions to resolve the determined conflict between the first set of resources and the second set of resources.

16. The method of claim 15, wherein the detection comprises detecting that the second vehicle is within a threshold distance away from the first vehicle.

17. The method of claim 15, further comprising obtaining the one or more signals from the second vehicle via a sidelink communication associated with at least one of Long Term Evolution (LTE) technology or 5G New Radio technology or via a dedicated short range communication (DSRC).

18. The method of claim 15, further comprising establishing a connection with the second vehicle.

19. The method of claim 18, wherein the connection comprises a vehicle-to-vehicle connection over a PC5 interface.

20. The method of claim 15, further comprising determining that the one or more first sensors of the second vehicle located at least in the first portion of the second vehicle have the potential to cause interference to the one or more first sensors of the first vehicle located in at least the first portion of the first vehicle based, at least in part, on a proximity of the one or more first sensors of the second vehicle to the one or more first sensors of the first vehicle.

21. The method of claim 20, further comprising:
   based on the determination that the one or more first sensors of the second vehicle have the potential to cause interference to the one or more first sensors of the first vehicle, providing signaling for transmission to the second vehicle, said signaling including at least a first request for the first set of resources allocated to the one or more first sensors of the second vehicle located at least in the first portion of the second vehicle.

22. The method of claim 21, further comprising determining one or more additional sensors of the second vehicle located in a second portion of the second vehicle have the potential to cause interference to the one or more first sensors of the first vehicle located in at least the first portion of the first vehicle or one or more additional sensors of the first vehicle located in a second portion of the first vehicle based, at least in part, on a proximity of the one or more first sensors of the second vehicle to at least one of the one or more first sensors of the first vehicle or the one or more additional sensors of the first vehicle.

23. The method of claim 21, wherein the signaling further comprises a second request for a third set of resources allocated to the one or more additional sensors of the second vehicle located in the second portion of the second vehicle that have the potential to cause interference to the one or more first sensors of the first vehicle located in the second portion of the first vehicle or the one or more additional sensors of the first vehicle located in the second portion of the first vehicle.

24. The method of claim 15, wherein the determination that the first set of resources conflict with the second set of resources comprises determining that at least one of time resource or frequency resource of the first set of resources overlaps at least one of time resource or frequency resource of the second set of resources.

25. The method of claim 15, wherein the performance of the one or more actions to resolve the determined conflict between the first set of resources and the second set of resources comprises selecting a third set of resources, for the one or more first sensors of the first vehicle, that do not overlap at least one of the time resource or frequency resource of the first set of resources allocated to one or more first sensors of the second vehicle.

26. The method of claim 25, further comprising operating the one or more first sensors of the first vehicle by using the third set of resources at least during a period of time in which the second vehicle is in proximity of the first vehicle.

27. The method of claim 25, further comprising reducing a transmission power associated with the third set of resources allocated to the one or more first sensors located in the first portion of the first vehicle.

28. The method of claim 24, wherein the performance of the one or more actions to resolve the determined conflict between the first set of resources and the second set of resources comprises providing signaling to the second vehicle requesting the second vehicle to select a third set of resources, for the one or more first sensors of the second vehicle, that do not overlap at least one of the time resource or frequency resource of the second set of resources allocated to the one or more first sensors of the first vehicle.

29. The method of claim 15, wherein the one or more actions comprise reducing a transmission power associated with the second set of resources or requesting the second vehicle to reduce a transmission power associated with the first set of resources.

30. A first vehicle, comprising:
  at least one antenna; and
  a processing system configured to:
    detect, via the at least one antenna, a second vehicle is in proximity of the first vehicle;
    determine that the second vehicle includes an intra-vehicle network based on one or more signals obtained from the second vehicle;
    provide a request for transmission to the second vehicle for resource allocation information associated with the intra-vehicle network of the second vehicle, the resource allocation information indicating a first set of resources allocated to one or more first sensors of the second vehicle located at least in a first portion of the second vehicle;
    obtain the resource allocation information from the second vehicle in response to the request;
    determine that the first set of resources conflict with a second set of resources allocated to one or more first sensors of the first vehicle located in at least a first portion of the first vehicle that corresponds to the first portion of the second vehicle; and
    perform one or more actions to resolve the determined conflict between the first set of resources and the second set of resources.

* * * * *